US010692112B2

(12) United States Patent
von Cavallar et al.

(10) Patent No.: US 10,692,112 B2
(45) Date of Patent: Jun. 23, 2020

(54) DISPLAY CONTROL SYSTEM, METHOD, RECORDING MEDIUM AND DISPLAY APPARATUS NETWORK

(71) Applicant: International Business Machines Corporation, Armonk, NY (US)

(72) Inventors: Stefan von Cavallar, Sandringham (AU); Timothy Michael Lynar, Melbourne (AU); Jorge Andres Moros Ortiz, Carlton (AU); John Michael Wagner, Plainville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 15/194,768

(22) Filed: Jun. 28, 2016

(65) Prior Publication Data

US 2017/0372373 A1    Dec. 28, 2017

(51) Int. Cl.
*G06Q 30/02* (2012.01)
*G09G 5/00* (2006.01)
*G06F 3/147* (2006.01)
*G06F 3/048* (2013.01)

(52) U.S. Cl.
CPC ......... *G06Q 30/0269* (2013.01); *G06F 3/048* (2013.01); *G06F 3/147* (2013.01); *G09G 5/006* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 6,587,755 B1* | 7/2003 | Smith | ................ | G06Q 30/0269 340/928 |
| 7,515,136 B1* | 4/2009 | Kanevsky | .......... | G06Q 30/0267 345/156 |
| 2005/0197164 A1* | 9/2005 | Chan | ...................... | G06Q 30/02 455/566 |
| 2007/0226762 A1* | 9/2007 | Girgis | .............. | G08B 13/19658 725/33 |

(Continued)

FOREIGN PATENT DOCUMENTS

WO    WO2008138144 A1 *  11/2008    ............. H04H 60/31

OTHER PUBLICATIONS

A Novel Viewer Counter for Digital Billboards, Chen et al., Fifth International Conference on Intelligent Information Hiding and Multimedia Signal Processing, 2009.*

(Continued)

*Primary Examiner* — David J Stoltenberg
(74) *Attorney, Agent, or Firm* — Joseph Petrokaitis, Esq.; McGinn IP Law Group, PLLC (57) ABSTRACT

A display control method, system, and non-transitory computer readable medium for a digital billboard display, include an attribute identification circuit configured to identify attributes of each user of a group of users viewing the digital billboard display, a content determining circuit configured to determine a content type to be displayed on the digital billboard based on an aggregation of all of the attributes of the group of users identified by the attribute identification circuit, and a display augmenting circuit configured to deliver the content type to the digital billboard display.

9 Claims, 5 Drawing Sheets

(56) References Cited

U.S. PATENT DOCUMENTS

| | | | | |
|---|---|---|---|---|
| 2009/0197616 | A1* | 8/2009 | Lewis | G06Q 30/02 455/456.1 |
| 2009/0217315 | A1* | 8/2009 | Malik | G06K 9/00362 725/9 |
| 2010/0048300 | A1* | 2/2010 | Capio | G06Q 30/02 463/36 |
| 2010/0145792 | A1* | 6/2010 | Worthen | G06Q 30/02 705/14.42 |
| 2010/0199302 | A1* | 8/2010 | Girgis | G08B 13/19658 725/33 |
| 2011/0035282 | A1* | 2/2011 | Spatscheck | G06Q 30/02 705/14.58 |
| 2011/0167342 | A1* | 7/2011 | de la Pena | G06F 3/016 715/702 |
| 2011/0179436 | A1* | 7/2011 | Candelore | H04N 21/4542 725/25 |
| 2012/0078725 | A1* | 3/2012 | Maitra | G06Q 30/0269 705/14.66 |
| 2012/0116888 | A1* | 5/2012 | Hendrickson | G06Q 30/02 705/14.66 |
| 2012/0116892 | A1* | 5/2012 | Opdycke | G06Q 30/02 705/14.69 |
| 2013/0195322 | A1* | 8/2013 | Santhiveeran | G06Q 30/0251 382/118 |
| 2013/0304574 | A1* | 11/2013 | Thomas | G06Q 30/0269 705/14.53 |
| 2014/0007148 | A1* | 1/2014 | Ratliff | H04N 21/251 725/12 |
| 2014/0052534 | A1* | 2/2014 | Gandhi | G06Q 30/0269 705/14.58 |
| 2014/0379477 | A1* | 12/2014 | Sheinfeld | G06Q 30/0251 705/14.58 |
| 2015/0009117 | A1* | 1/2015 | Peters | G06F 3/013 345/156 |
| 2015/0081452 | A1* | 3/2015 | Anthony | G06Q 30/0271 705/14.67 |
| 2015/0095124 | A1* | 4/2015 | Felt | G06Q 30/0259 705/14.5 |
| 2015/0135309 | A1* | 5/2015 | Karmarkar | G06F 16/532 726/19 |
| 2015/0138118 | A1* | 5/2015 | Liu | G09F 27/00 345/173 |
| 2015/0161672 | A1* | 6/2015 | Jung | G06O 30/0269 705/14.66 |
| 2015/0253930 | A1* | 9/2015 | Kozloski | G06F 3/04817 345/175 |
| 2015/0332328 | A1* | 11/2015 | Kim | G06Q 30/0261 705/14.58 |
| 2015/0358594 | A1* | 12/2015 | Marshall | G06F 3/013 345/419 |
| 2015/0363698 | A1* | 12/2015 | Kritt | G06Q 30/0255 706/11 |
| 2016/0142995 | A1* | 5/2016 | Shuster | G10L 19/018 455/456.1 |
| 2016/0300388 | A1* | 10/2016 | Stafford | A63F 13/211 |
| 2016/0358247 | A1* | 12/2016 | Majumdar | G06Q 30/08 |
| 2016/0364397 | A1* | 12/2016 | Lindner | H04N 21/44016 |
| 2017/0358002 | A1* | 12/2017 | Ahuja | G06F 16/532 |
| 2017/0358004 | A1* | 12/2017 | Ahuja | G06Q 30/0261 |
| 2017/0364959 | A1* | 12/2017 | Kim | G06Q 30/0261 |
| 2018/0041805 | A1* | 2/2018 | Gibbon | H04N 21/4532 |

OTHER PUBLICATIONS

Audience Measurement of Digital Signage: Quantitative Study in Real-World Environment Using Computer Vision, Ravnik et al., Published by Oxford University Press on behalf of the British Computer Society, Feb. 6, 2013.*

Interactive and Audience Adaptive Digital Signage Using Real-Time Computer Vision, Revnik et al., International Journal of Advanced Robotic Systems, 2013, vol. 10, 107:2013.*

* cited by examiner

DISPLAY CONTROL SYSTEM, METHOD, RECORDING MEDIUM AND DISPLAY APPARATUS NETWORK

BACKGROUND

The present invention relates generally to a display control system and a display network, and more particularly, but not by way of limitation, to a system for augmenting (e.g., changing) a display of a display apparatus (e.g., a billboard, "smart-board", etc.) with appropriate media content to present to the viewing audience, as well as appropriate presentation styles based on a demographic (e.g., attributes) of a group of users viewing the display apparatus.

Conventional informational boards/billboards typically include a non-interactive, static paper poster, adhered to a surface. Some newer forms of information billboards are digital, and offer the ability to dynamically change the presented content.

Often, the creator of the information is trying to target either a specific demographic, or a wider audience. In targeting a wide audience, the content of the information may not be appropriate. For example, health information might be explained and presented differently for an adult compared to that for a child. When presented to an adult, it may also be desired to tailor the information and its presentation based upon other characteristics, for example, the person's level of reading ability.

That is, there is a technical problem in the conventional techniques in that the conventional techniques include pre-loaded displays that are not customized based on a dynamic demographic of users viewing the billboard.

SUMMARY

In view of the technical problem in the art, the inventors have considered the technical solution to the technical problem by augmenting a display of a display apparatus based on a real-time assessment of a group of users viewing the display such that the display is customized to be appropriate for the demographic of the group of users.

In an exemplary embodiment, the present invention can provide a display control system for a digital billboard display, including an attribute identification circuit configured to identify attributes of each user of a group of users viewing the digital billboard display, a content determining circuit configured to determine a content type to be displayed on the digital billboard based on an aggregation of all of the attributes of the group of users identified by the attribute identification circuit, and a display augmenting circuit configured to deliver the content type to the digital billboard display.

Further, in another exemplary embodiment, the present invention can provide a display control method for a digital billboard display, the method including identifying attributes of each user of a group of users viewing the digital billboard display, determining a content type to be displayed on the digital billboard based on an aggregation of all of the attributes of the group of users identified by the identifying, and delivering the content type to the digital billboard display.

Even further, in another exemplary embodiment, the present invention can provide a non-transitory computer-readable recording medium recording a display control program for a digital billboard display, the program causing a computer to perform: identifying attributes of each user of a group of users viewing the digital billboard display, determining a content type to be displayed on the digital billboard based on an aggregation of all of the attributes of the group of users identified by the identifying, and delivering the content type to the digital billboard display.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
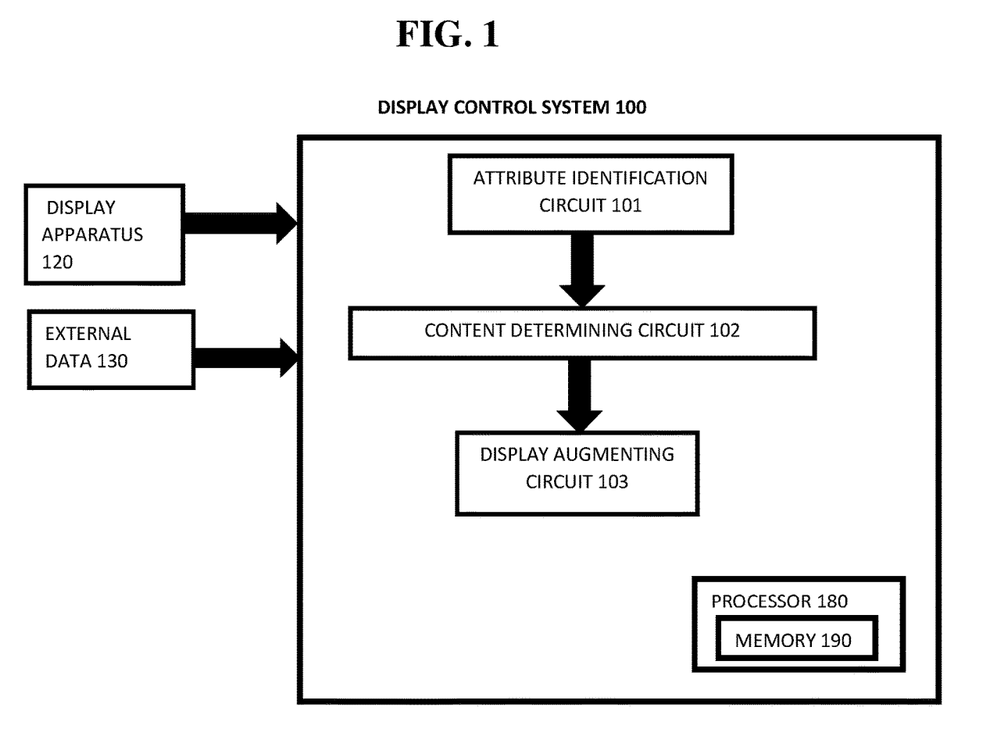
FIG. 1 exemplarily shows a block diagram illustrating a configuration of a display control system 100.

With reference now to FIG. 1, the display control system 100 includes an attribute identification circuit 101, a content determining circuit 102, and a display augmenting circuit 103. The display control system 100 includes a processor 180 and a memory 190, with the memory 190 storing instructions to cause the processor 180 to execute each circuit of display control system 100. The processor and memory may be physical hardware components, or a combination of hardware and software components.

Although the display control system 100 includes various circuits, it should be noted that a display control system can include modules in which the memory 190 stores instructions to cause the processor 180 to execute each module of display control system 100.

Also, each circuit can be a stand-alone device, unit, module, etc. that can be interconnected to cooperatively produce a transformation to a result.

With the use of these various circuits, the display control system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 4:
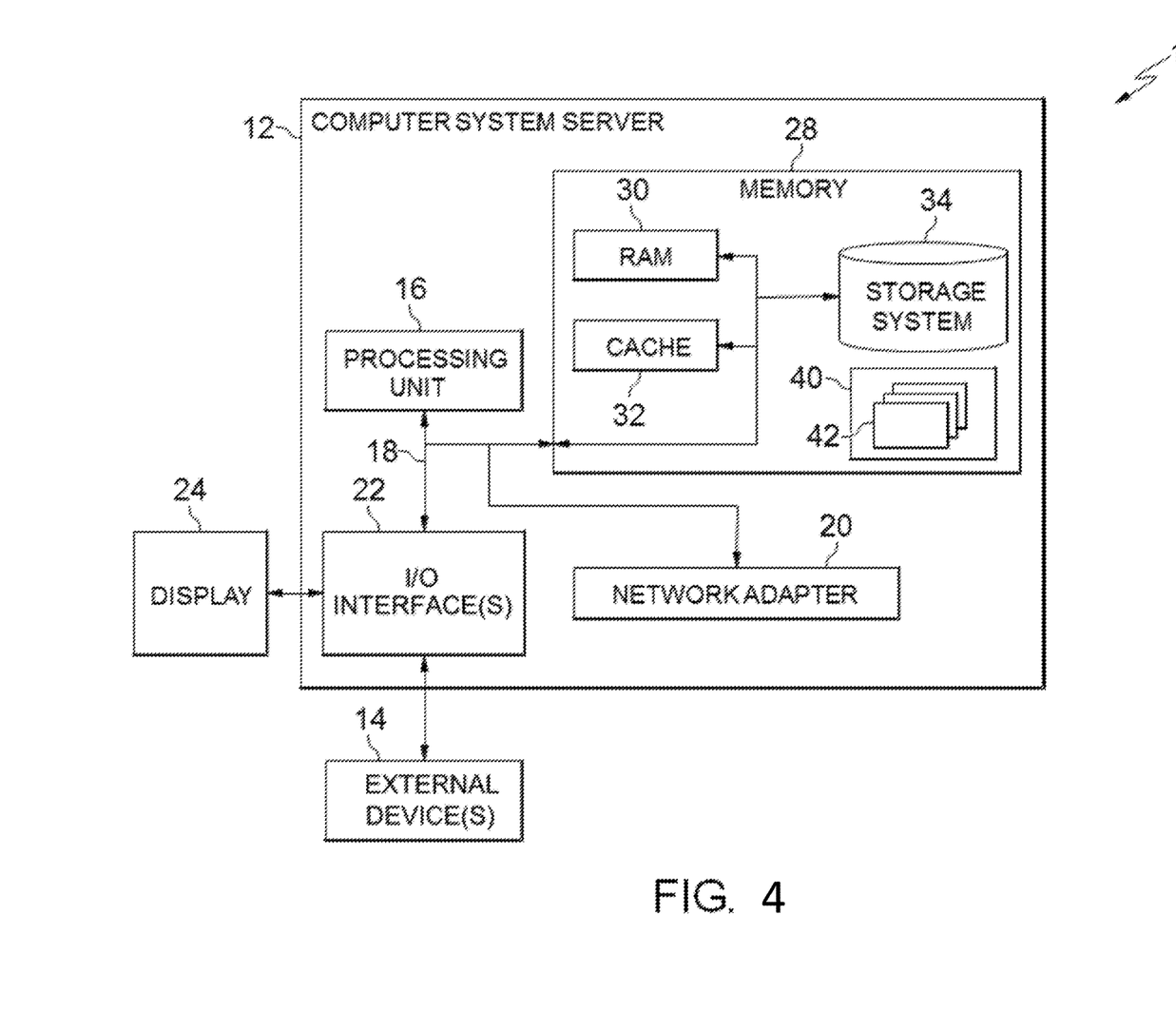
FIG. 4 depicts a cloud computing node 10 according to an exemplary embodiment of the present invention.
Figure 5:
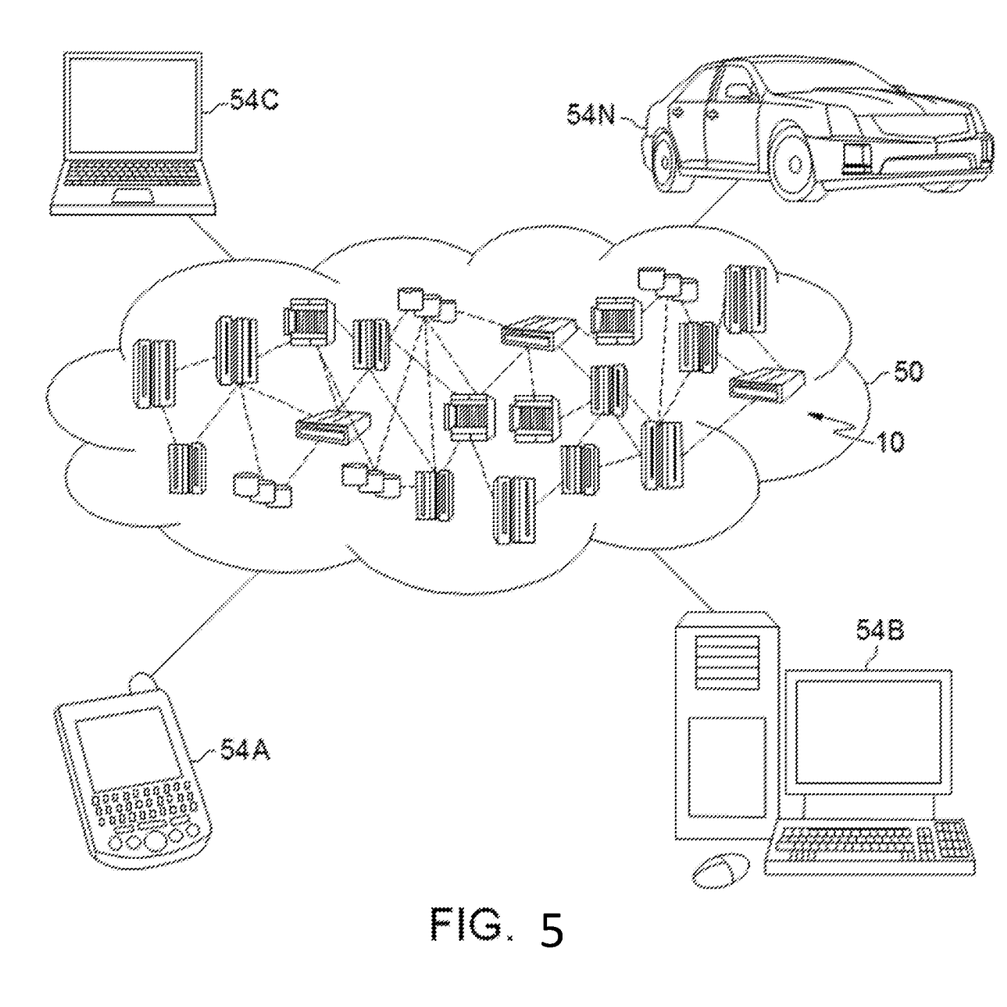
FIG. 5 depicts a cloud computing environment 50 according to another exemplary embodiment of the present invention.
Figure 6:
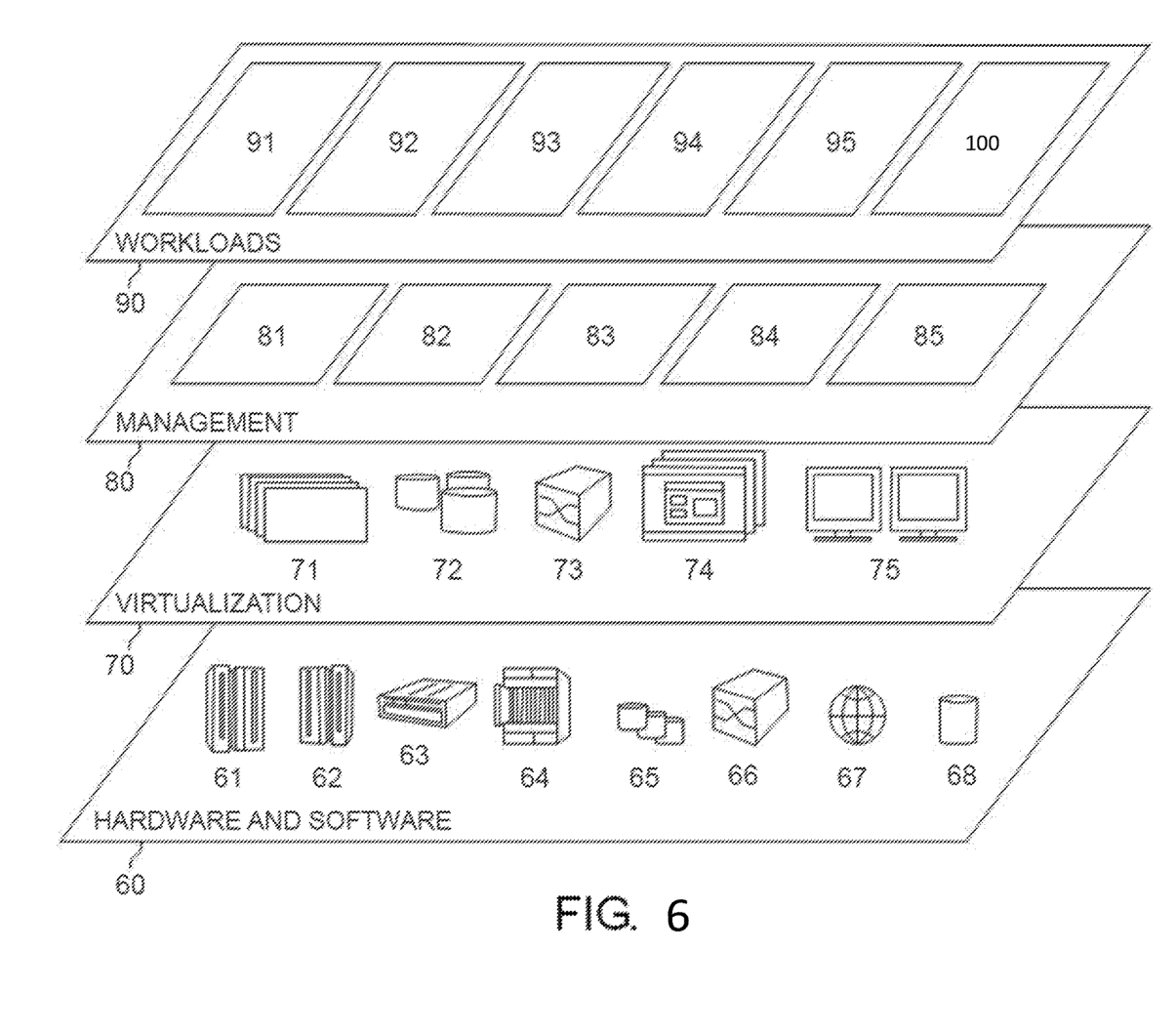
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the display control system 100 (FIG. 6), it is noted that the present invention can be implemented outside of the cloud environment.

The attribute identification circuit 101 identifies attributes of each user of a group of users viewing a display apparatus 120 via a sensor(s) installed on the display apparatus 120. That is, the attribute identification circuit 101 individually identifies attributes for each user in a proximity of the display apparatus 120 such that the display apparatus 120 can be augmented (e.g., changed) as described later.

The sensor(s) of the display apparatus can include, for example, a camera for image and video processing, a microphone for audio processing, a Global Positioning System (GPS) for location tracking, environmental sensors, such as temperature, rainfall, sun exposure, etc., seismic sensors, medical sensors, such as infrared/heat detection, location services from mobile devices, etc.

The display apparatus 120 can include a digital billboard display, a "smart-board", or the like.

The attributes can include, for example, a number of users viewing the display apparatus 120, an age of each user, a gender of each user, demographical characteristics of the users, a movement and a mood assessment of each user (e.g., a cognitive factor of the user), a localized environmental weather condition experienced by each user, such as temperature and rainfall, a lighting condition (e.g., to modify a brightness of the display), a number of user devices in locality of the display apparatus, etc. That is, the attributes detected by the attribute identification circuit 101 contribute to determining a demographic of the group of users viewing the display apparatus.

The content determining circuit 102 determines a content type based on an aggregation of all of the attributes of each of the users to determine the best content type to represent the demographic of the group of users. That is, using the attributes identified by the attribute identification circuit 101, the content determining circuit 102 determine the appropriate media content (e.g., display) to present to the group of users, as well as appropriate presentation styles. The selection of media content can be determined from pre-defined rules, or via a machine learning-based algorithm.

For example, an appropriate media content could be audio or video or still images. That is, an outbreak of a diarrheal disease may require a public health information display. If the viewing audience is adults, then the media content could solely comprise of video or images that contain content suitable to convey a health message. However, if the audience was children, then the media content could solely comprise of cartoon images together with "child-appropriate" language to explain.

Also, external data 130 from other sources than the display apparatus 120 such as social networks, news networks, public health organizations may be used to further enhance the selection of appropriate content for presentation. Thus, the content determining circuit 102 can take into account a wider array of external data 130 (e.g. news feeds, social media, other government warning systems, etc.) that can be used to influence what information is presented, and how it should be presented along with the attributes of the users of the group of users.

The display augmenting circuit 103 augments (changes) a current content of the display apparatus 120 or delivers a customized content (e.g., if no content already displayed) to display new content customized to the group of users based on the attributes of the group of users. The display augmenting circuit 103 can also augment the display based on the external data 130.

Thus, the display control system 100 targets a group rather than an individual such that the content (display) is augmented to maximize the impact on a given group within the constraints that that group imposes. That is, the content determining circuit 102 is not aimed at one individual or at the largest group or groups, but instead optimizes for a highest cumulative predicted impact as determined by a predicted cumulative attention span of the group of users as a metric used to determine the predicted impact. The prediction (e.g., determination) by the content determining circuit 102 can be based upon prior cumulative attention spans (e.g. learned data) or based on the attributes where the group of users is comprised of a plurality of demographics having different attributes. The measurement (validation) of the actual impact prediction is performed in real-time as sensed with the group of users actively viewing. Some groups contain individuals that place constraints on what can be displayed based on the attributes detected or the demographic (e.g. children, illiterate, blind, deaf, a cohort of users such as autism, etc.).

In one embodiment, the content may be a health alert to be displayed to a group of ten users comprising eight adults and two children as detected by the attribute identification circuit 101 using the sensors of the display apparatus 120. That is, the attribute identification circuit 101 identifies the attributes of the group having ten users, the age of the users (e.g., children and adults), and a movement/mood assessment that each of the group of users is looking directly at the display apparatus 120. Based on the identified attributes, the content determining circuit 102 determines that the content is tailored for adults but, because of the children being present, the content material is restricted to be suitable for children consumption (e.g., no vulgarity, etc.). The display augmenting circuit 103 augments the display to best fit the determined aggregated demographic (e.g., suited for adults without vulgar content because of children). It is noted that the system 100 dynamically updates the display based on a size of the group of users changing. For example, if the group of users goes from ten to fifteen and no longer includes children, the content determining circuit 102 will re-determine a best fit content based on the new aggregated demographic of the group of users.

Figure 2:
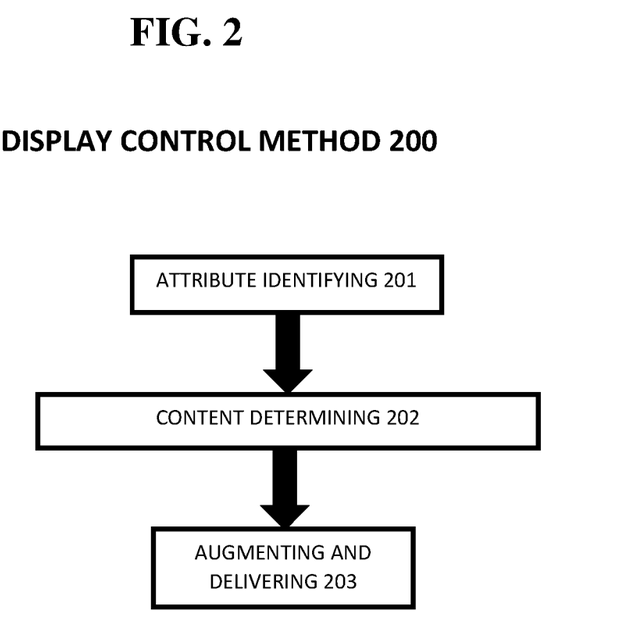
FIG. 2 exemplarily shows a high level flow chart for a display control method 200.

FIG. 2 shows a high level flow chart for a method 200 of display control.

Step 201 identifies attributes of each user of a group of user viewing a display apparatus 120 via a sensor(s) installed on the display apparatus 120.

Step 202 determines a content type based on an aggregation of all of the attributes of each of the users to determine the best content type to represent the demographic of the group of users.

Step 203 augments (e.g., changes) a current content of the display apparatus 120 or delivers a customized content (e.g., if no content already displayed) to display new content customized to the group of users based on the attributes of the group of users.

Figure 3:
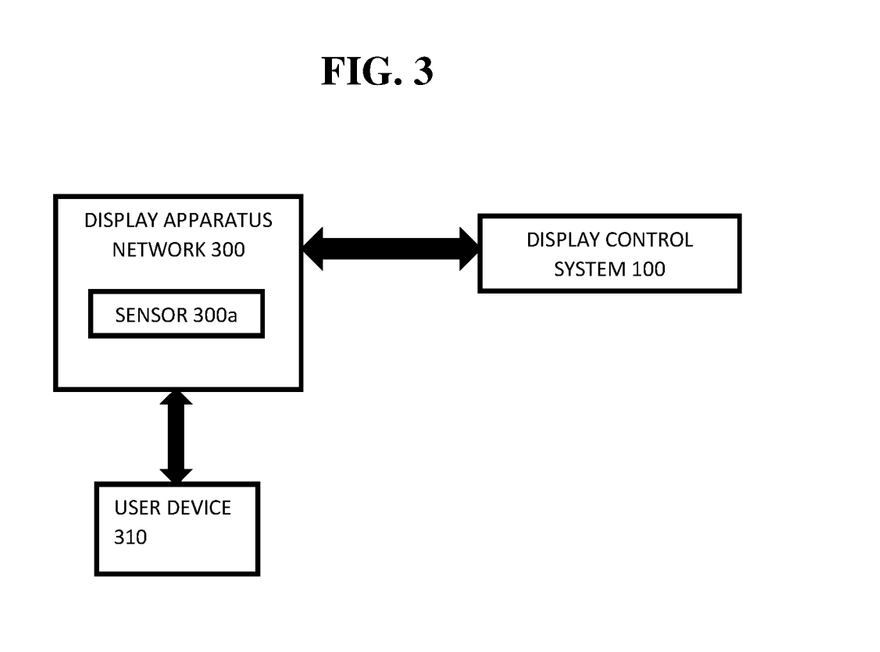
FIG. 3 exemplarily shows a display apparatus network 300 including a sensor 300a for displaying a display according to the display control system 100.

FIG. 3 shows a display apparatus network 300 including a plurality of display apparatuses 300 each having sensors 300a configured as a network, each of which displays the content customized for the group of users using the display control system 100. Also, the display apparatus network 300 can further be linked to a user device 310 such that each display apparatus 300 can also send the content to the user device 310 in a proximity of the network of display apparatuses 300. The display control system 100 delivers (or augments) via the augmenting circuit 103 the content to all of the display apparatuses 300 in the display apparatus network 300. Thus, the display apparatus network 300 can be installed in a city or across a large demographic to display content efficiently to a large group of users (e.g., health alerts in a village, evacuation messages to a region, etc.) through the use of a mesh network of display apparatuses 300 which can interact with each other, a server, and/or user devices 310.

Thus, the hardware of the display apparatus network 300 may also incorporate wireless networking capabilities that provide it with the ability to communicate with each other display apparatus, the system 100, and the user device 310. In some embodiments, networking may be provided through data over radio, satellite or other transport mediums.

Also, the display apparatuses of the display apparatus network include an in-built display panel is used to present visual media elements, with speakers used to present audio, but also may include the ability to stream the content to viewers' mobile devices. In some embodiments, the display apparatus may be simpler, such as a monochrome display, or more power efficient (such as digital paper display). The display apparatus may also integrate touch interaction capabilities to allow viewers to interact with a presented user interface.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the display control system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A display control system for a digital billboard display, the system comprising:
    an attribute identification circuit configured to identify attributes of each user of a group of users viewing the digital billboard display and that returns a maximum value of an impact on a given group within preset constraints to obtain a highest cumulative predicted impact on the given group as determined by a cumulative attention span of the group of users as a metric used to determine the impact;
    a content determining circuit configured to determine a content type to be displayed on the digital billboard based on an aggregation of all of the attributes of the group of users identified by the attribute identification circuit; and
    a display augmenting circuit configured to deliver the content type to the digital billboard display such that the content type is suitable for the group based on the highest cumulative predicted impact on the given group and to a mobile device of the user,
    wherein the content determining circuit further determines a new content type if the digital billboard display is currently displaying a content,
    wherein the display augmenting circuit augments the content type to be the new content type,
    wherein the attribute identification circuit dynamically identifies attributes of each user of the group of users as a group composition changes such that the content determining circuit continuously determines a new content type based on the dynamically identified attributes,
    wherein the attribute identification circuit identify the attributes of at least two users of the group of users viewing the digital billboard display,
    wherein the highest cumulative predicted impact is determined by the cumulative attention span of a subset of the group representing the group of users as the metric used to determine the impact,
    wherein the cumulative attention span is weighted highest out of the attributes for determining the content type,
    wherein, when the group of users includes an individual that places a constraint on a specific type the content type limiting the display of the content type such that the display of the content type is not harmful to the individual, the content type is restricted to content that is suitable for the individual that places the constraint on the specific type of new content rather than based on the aggregation of all of the attributes of the group of users,
    wherein the attributes include a localized environmental weather condition experienced by each user, a number of user devices in locality of the display apparatus, a movement and a mood assessment of each user, and a perceived attention level of each user, and wherein the digital billboard further comprises a touch interaction to facilitate interaction with the digital billboard by each user.

2. The system of claim 1, wherein the attributes comprise each of:
 a number of users viewing the digital billboard display;
 an age of each user;
 a gender of each user; and
 a demographical characteristic of each user.

3. The system of claim 1, wherein the digital billboard display comprises a sensor that detects the attributes of each of the users of the group of users.

4. The system of claim 1, wherein the content determining circuit further determines the content type based on external data including at least one of:
 a news feed;
 a social media feed; and
 a government warning alert.

5. A display control method for a digital billboard display, the method comprising:
 identifying attributes of each user of a group of users viewing the digital billboard display and that returns a maximum value of an impact on a given group within preset constraints to obtain a highest cumulative predicted impact on the given group as determined by a cumulative attention span of the group of users as a metric used to determine the impact;
 determining a content type to be displayed on the digital billboard based on an aggregation of all of the attributes of the group of users identified by the identifying;
 delivering the content type to the digital billboard display such that the content type is suitable for the group based on the highest cumulative predicted impact on the given group and to a mobile device of the user; and
 determining a new content type if the digital billboard display is currently displaying a content,
 wherein the delivering augments the content type to be the new content type,
 wherein the identifying dynamically identifies attributes of each user of the group of users as a group composition changes such that the determining continuously determines a new content type based on the dynamically identified attributes,
 wherein the attribute identification circuit identify the attributes of at least two users of the group of users viewing the digital billboard display,
 wherein the highest cumulative predicted impact is determined by the cumulative attention span of a subset of the group representing the group of users as the metric used to determine the impact,
 wherein the cumulative attention span is weighted highest out of the attributes for determining the content type,
 wherein, when the group of users includes an individual that places a constraint on a specific type the content type limiting the display of the content type such that the display of the content type is not harmful to the individual, the content type is restricted to content that is suitable for the individual that places the constraint on the specific type of new content rather than based on the aggregation of all of the attributes of the group of users,
 wherein the attributes include a localized environmental weather condition experienced by each user, a number of user devices in locality of the display apparatus, a movement and a mood assessment of each user, and a perceived attention level of each user, and wherein the digital billboard further comprises a touch interaction to facilitate interaction with the digital billboard by each user.

6. The method of claim 5, wherein the attributes comprise each of:
 a number of users viewing the digital billboard display;
 an age of each user;
 a gender of each user; and
 a demographical characteristic of each user.

7. The method of claim 5, wherein the digital billboard display comprises a sensor that detects the attributes of each of the users of the group of users.

8. The method of claim 5, wherein the determining further determines the content type based on external data including at least one of:
 a news feed;
 a social media feed; and
 a government warning alert.

9. A non-transitory computer-readable recording medium recording a display control program for a digital billboard display, the program causing a computer to perform:
 identifying attributes of each user of a group of users viewing the digital billboard display and that returns a maximum value of an impact on a given group within preset constraints to obtain a highest cumulative predicted impact on the given group as determined by a cumulative attention span of the group of users as a metric used to determine the impact;
 determining a content type to be displayed on the digital billboard based on an aggregation of all of the attributes of the group of users identified by the identifying;
 delivering the content type to the digital billboard display such that the content type is suitable for the group based on the highest cumulative predicted impact on the given group and to a mobile device of the user; and
 determining a new content type if the digital billboard display is currently displaying a content,
 wherein the delivering augments the content type to be the new content type,
 wherein the identifying dynamically identifies attributes of each user of the group of users as a group composition changes such that the determining continuously determines a new content type based on the dynamically identified attributes,
 wherein the attribute identification circuit identify the attributes of at least two users of the group of users viewing the digital billboard display,
 wherein the highest cumulative predicted impact is determined by the cumulative attention span of a subset of the group representing the group of users as the metric used to determine the impact,
 wherein the cumulative attention span is weighted highest out of the attributes for determining the content type,
 wherein, when the group of users includes an individual that places a constraint on a specific type the content type limiting the display of the content type such that the display of the content type is not harmful to the individual, the content type is restricted to content that is suitable for the individual that places the constraint on the specific type of new content rather than based on the aggregation of all of the attributes of the group of users,
 wherein the attributes include a localized environmental weather condition experienced by each user, a number of user devices in locality of the display apparatus, a movement and a mood assessment of each user, and a perceived attention level of each user, and wherein the digital billboard further comprises a touch interaction to facilitate interaction with the digital billboard by each user.

* * * * *